United States Patent
Xie et al.

(10) Patent No.: US 11,814,546 B2
(45) Date of Patent: Nov. 14, 2023

(54) PHOTOINITIATING COMPOSITION SUITABLE FOR UV-LED LIGHT IRRADIATION AND AN AQUEOUS COATING COMPOSITION PREPARED THEREFROM

(71) Applicant: Guangdong Huarun Paints Co., Ltd, Foshan (CN)

(72) Inventors: Han Xie, Foshan (CN); Gang Duan, Northbrook, IL (US); Xi Zhao, Foshan (CN); Shigang Fan, Foshan (CN); Hongbin Chen, Foshan (CN)

(73) Assignee: Guangdong Huarun Paints Co., Ltd, Foshan (CN)

( * ) Notice: Subject to any disclaimer, the term of this patent is extended or adjusted under 35 U.S.C. 154(b) by 738 days.

(21) Appl. No.: 16/635,676

(22) PCT Filed: Jul. 30, 2018

(86) PCT No.: PCT/US2018/044313
§ 371 (c)(1),
(2) Date: Jan. 31, 2020

(87) PCT Pub. No.: WO2019/027872
PCT Pub. Date: Feb. 7, 2019

(65) Prior Publication Data
US 2021/0122931 A1      Apr. 29, 2021

(30) Foreign Application Priority Data

Jul. 31, 2017    (CN) .......................... 201710645098.X (51) Int. Cl.
| | | |
|---|---|---|
| *C08F 2/48* | (2006.01) | |
| *C09D 7/40* | (2018.01) | |
| *C09D 7/80* | (2018.01) | |
| *C09D 133/08* | (2006.01) | |
| *C09D 143/04* | (2006.01) | |
| *C09D 175/16* | (2006.01) | |
| *C09D 5/02* | (2006.01) | |

(52) U.S. Cl.
CPC ............. *C09D 7/40* (2018.01); *C08F 2/48* (2013.01); *C09D 5/022* (2013.01); *C09D 7/80* (2018.01); *C09D 133/08* (2013.01); *C09D 143/04* (2013.01); *C09D 175/16* (2013.01)

(58) Field of Classification Search
CPC .... C08F 2/48; C09D 7/40; C09D 7/80; C09D 5/022; C09D 133/08; C09D 143/04; C09D 175/16

USPC .............................................. 428/537, 537.1
See application file for complete search history.

(56) References Cited

U.S. PATENT DOCUMENTS

| 6,251,963 | B1 * | 6/2001 | Kohler ................ C07F 9/3264 |
| | | | 522/86 |
| 8,513,320 | B2 | 8/2013 | Rooijmans |
| 8,809,411 | B2 | 8/2014 | Rooijmans |
| 2002/0113925 | A1 * | 8/2002 | Higashi ............ G02F 1/133553 |
| | | | 349/113 |
| 2010/0166966 | A1 * | 7/2010 | Chang ................. H01M 8/1088 |
| | | | 528/125 |
| 2010/0215875 | A1 * | 8/2010 | Yang ..................... B41M 7/0027 |
| | | | 428/32.22 |
| 2015/0119486 | A1 | 4/2015 | Belelie et al. |
| 2017/0158857 | A1 | 6/2017 | Miyake et al. |

FOREIGN PATENT DOCUMENTS

| CN | 101622019 | | 1/2010 | |
| CN | 101622020 | | 1/2010 | |
| CN | 102535245 | A | 7/2012 | |
| CN | 103666237 | A | 3/2014 | |
| CN | 103333602 | A | 9/2015 | |
| CN | 106471027 | | 3/2017 | |
| EP | 2042570 | A1 | 8/2008 | |
| EP | 3162826 | | 5/2017 | |
| EP | 3162826 | A1 * | 5/2017 | ............ C08F 299/06 |
| WO | WO2016166042 | | 10/2016 | |

OTHER PUBLICATIONS

Office Action for Chinese patent application No. 201710645098.X, dated Nov. 25, 2020 (9 pages, including inglish summary of substantive portion of Office Action).
Office Action for Chinese patent application No. 201710645098.X, dated Jun. 19, 2020 (23 pages, including English summary of substantive portion of Office Action).
Notice of Allowance for Chinese patent application No. 201710645098.X, dated Apr. 8, 2021 (5 pages, including English translation).
International Search Report and Written Opinion for PCT/US2018/044313 dated Nov. 7, 2018.

* cited by examiner

*Primary Examiner* — Kelechi C Egwim (57) ABSTRACT

The present disclosure relates to a photoinitiating composition suitable for UV-LED light irradiation comprising: a) a photoinitiating system suitable for LED light irradiation having a wavelength in the range of 340-420 nm; b) a dispersing medium; wherein the dispersing medium comprises an organic solvent which is miscible with water.

20 Claims, 1 Drawing Sheet

PHOTOINITIATING COMPOSITION SUITABLE FOR UV-LED LIGHT IRRADIATION AND AN AQUEOUS COATING COMPOSITION PREPARED THEREFROM

CROSS REFERENCE TO RELATED APPLICATIONS

This application is a national stage filing under 35 U.S.C. § 371 of International Application No. PCT/US2018/044313 filed on Jul. 30, 2018 and entitled "A PHOTOINITIATING COMPOSITION SUITABLE FOR UV-LED LIGHT IRRADIATION AND AN AQUEOUS COATING COMPOSITION PREPARED THEREFROM", which claims priority to Chinese Application No. 201710645098.X filed on Jul. 31, 2017 and entitled "PHOTOINITIATOR COMPOSITION SUITABLE FOR UV-LED LIGHT RADIATION AND WATERBORNE PAINT COMPOSITION PREPARED THEREFROM", the disclosures of both of which are incorporated herein by reference in their entirety.

TECHNICAL FIELD

The present disclosure relates to a photoinitiating composition, and more particularly to a photoinitiating composition suitable for UV-LED light irradiation. The present disclosure also relates to a UV-LED curable aqueous coating composition comprising the photoinitiating composition and a process for preparing the UV-LED curable aqueous coating composition.

BACKGROUND

UV curing technology (UV) has the advantages of environmental protection, energy saving, fast curing, controlled curing and the like. Thus, nearly 20 years it achieves rapid development and is widely used in the coatings, inks, adhesives, microelectronics materials and other fields. Compared with high-energy UV curing technology by using conventional mercury lamp, UV-LED has the advantages of low energy consumption, convenient transportation and long service life. Therefore, UV-LED curing has been widely concerned in recent years.

Waterborne UV-LED curing technology combines the advantages of UV-LED curing technology and waterborne coating technology. Such technology not only has the characteristics of low energy consumption, but also has the advantage of safety and environmental protection due to the use of water as a diluent, thus it becomes the new area of researching and developing UV-LED curing technology.

However, most of the photoinitiators currently used in UV-LED curing systems are oil-soluble and are not suitable for waterborne UV-LED curing technology. In view of the limitations of oil-soluble photoinitiators, people began to pay attention to the research and development of new aqueous photoinitiator. It has been proposed to modify the structure of the photoinitiator by introducing an anionic, cationic or nonionic hydrophilic groups in the molecular chain of the photoinitiator to enhance its water dispersibility, such as IRGACURE 819DW from BASF. However, these modification methods are often difficult and the resulting aqueous photoinitiator is also very expensive.

Thus, there remains a need in the coatings industry for a photoinitiating composition suitable for waterborne UV-LED curing techniques.

SUMMARY

The present disclosure in one aspect provides a photoinitiating composition, comprising a) a photoinitiating system suitable for LED light irradiation having a wavelength in the range of 340-420 nm; b) a dispersing medium; wherein the dispersing medium comprises an organic solvent which is miscible with water.

In another aspect the present disclosure provides an UV-LED curable aqueous coating composition comprising the photoinitiating composition according to the present disclosure, water, an aqueous latex containing ethylenically unsaturated functional group, and optionally additional additives.

In still another aspect the present disclosure provides a process for formulating an UV-LED curable aqueous coating composition, comprising: i) formulating the photoinitiating composition according to the present disclosure; and ii) mixing the photoinitiating composition of step i) with water, an aqueous latex containing ethylenically unsaturated functional group and optionally additional additives to formulate the UV-LED curable aqueous coating composition.

In still another aspect the present disclosure provides an article, comprising the substrate that is fully or partially coated with the UV-LED curable aqueous coating composition according to the present disclosure or the UV-LED curable aqueous coating composition obtainable by the process according to the present disclosure thereon.

The inventors of the present disclosure have ground breakingly provided a photoinitiating composition comprising a photoinitiating system suitable for LED light irradiation having a wavelength in the range of 340-420 nm and a dispersing medium, wherein the dispersing medium comprises an organic solvent which is miscible with water.

The inventors of the present disclosure have surprisingly found that the above-mentioned photoinitiating compositions can be used directly in the preparation of UV-LED curable aqueous coating compositions and exhibit high initiating efficiency, improved water dispersibility and good compatibility with various aqueous resin systems.

The inventors of the present disclosure have also surprisingly found that the cured coating formed from such a UV-LED curable aqueous coating composition has comparable, even better hardness and scratch resistance than a cured coating formed from conventional water-based coating compositions and solvent-based coating compositions.

The details of one or more embodiments of the disclosure are set forth in the description below. Other features, objects, and advantages of the disclosure will be apparent from the description, and from the claims

DETAILED DESCRIPTION

As used herein, "a", "an", "the", "at least one", and "one or more" are used interchangeably. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this disclosure, as along as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "photoinitiating system" refers to one compound or the combination of several compounds that are capable of being excited to produce an active species having the ability to initiate polymerization by absorbing radiation energy. In one embodiment of the present disclosure, the photoinitiating system comprises one or more photoinitiators. In another embodiment of the present disclosure, the photoinitiator contained in the photoinitiating system further comprises one or more photosensitizer, in case that by absorbing a specific radiation energy the photoinitiator contained in the photoinitiating system cannot produce an active species having the ability to initiate polymerization.

As used herein, the term "photosensitizer" refers to a compound that enhances the spectral response of a photoinitiator by extending the sensitivity of the photoinitiator to a particular wavelength. Typically, under light radiation conditions, the photosensitizer is capable of absorbing the portion of light that does not excite the photoinitiator and transfers the energy to the photoinitiator. The photoinitiator transitions from the ground state to the excited state after receiving the energy to produce the active species, which triggers the polymerization reaction, and after transferring the energy to the photoinitiator the photosensitizer returns to the its initial state, and its chemical properties do not change. In one embodiment of the photoinitiating system comprising a photoinitiator and a photosensitizer having an absorption in the wavelength range of 340-420 nm according to the present disclosure, the photoinitiator has a response to the light in the wavelength range of 340-420 nm with the aid of a photosensitizer and then produces the active species.

As used herein, the term "dispersing medium" refers to a liquid capable of dissolving or dispersing one or more substances. In one embodiment of the present disclosure, the dispersing medium is capable of dissolving at least a portion of the photoinitiating system. As used herein, the term "an organic solvent which is miscible with water" refers to an organic solvent that can be mixed with water to form a homogeneous solution.

In the context of a particular compound or derivative thereof, the term "derivative thereof" refers to a compound in which one or more hydrogen atoms of a particular compound molecule are substituted by an atom or group known to those skilled in the art. In the embodiments of the present disclosure, the substituted atoms or groups include, but are not limited to, alkyl, alkoxy, halogen, carboxyl, ester group, amide group or combinations thereof.

As used herein, the term "heat-sensitive substrate" refers to a substrate that the properties thereof are partially or completely deteriorated by the action of heat. Typically, the heat-sensitive substrate includes wood, plastic, and the like.

In the context of a photoinitiator in a photoinitiating system, "having a significant absorption under LED light irradiation in the wavelength range of 340-420 nm" means that the maximum absorption peak of the photoinitiator is within the range of 340-420 nm. In one embodiment of the present disclosure, examples of such photoinitiators include, but are not limited to, IRGACURE 819, TPO, and the like.

In the context of a photoinitiator in a photoinitiating system, "not having significant absorption under LED light irradiation in the wavelength range of 340-420 nm" means that the maximum absorption peak of the photoinitiator is outside the range of 340-420 nm, the absorption efficiency is relatively low even if it can absorb light in the range of 340-420 nm, which is insufficient to effectively initiate the polymerization reaction. In one embodiment of the present disclosure, examples of such photoinitiators include, but are not limited to, IRGACURE 907, IRGACURE 369, and the like.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

According to a first aspect of the present disclosure, it provides a photoinitiating composition comprising a) a photoinitiating system suitable for LED light irradiation having a wavelength in the range of 340-420 nm; and b) a dispersing medium, wherein the dispersing medium comprises an organic solvent which is miscible with water.

Photoinitiating System

The photoinitiating composition according to the present disclosure comprises a photoinitiating system suitable for LED light irradiation having a wavelength in the range of 340-420 nm. The photoinitiator constituting the photoinitiating system or a part thereof can be selected from a wide range. The photoinitiating system may comprise a photoinitiator that does not have significant absorption under LED light radiation in the wavelength range of 340-420 nm or may comprise a photoinitiator that has significant absorption under LED light radiation in the wavelength range of 340-420 nm.

Figure 1:
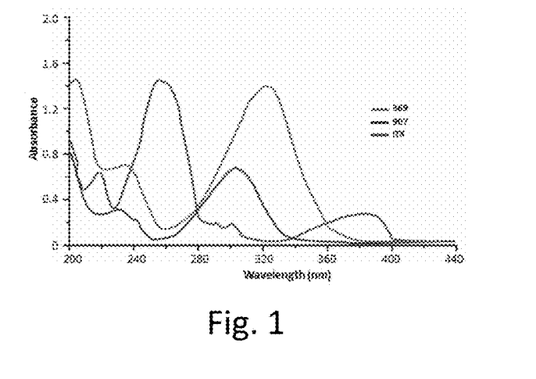
FIG. 1 schematically shows the absorption spectra of α-aminoketone photoinitiators and ITX.

In one embodiment of the present disclosure, the photoinitiating system comprises an α-amino ketone photoinitiator that does not have significant absorption under LED light radiation in the wavelength range of 340-420 nm. In the context of the present disclosure, "α-amino ketone" refers to a class of organic compounds containing an amino group and a keto group in the same molecule, wherein the amino group is at the α-position of the keto group. As a typical cleavage type photoinitiator, the absorption wavelength of α-amino ketone does not exceed 385 nm, and its absorption of LED light having longer wavelength is low. FIG. 1 schematically shows the absorption spectra of IRGACURE 907 and IRGACURE 369 as typical α-amino ketone photoinitiators.

According to the present disclosure, the α-amino ketone includes α-aminoalkyl phenone. Examples of α-aminoalkyl phenones suitable for the present disclosure include, but are not limited to, 2-methyl-1-[4-(methylthio)phenyl]-2-morpholinopropanone-1, 2-benzyl-2-(dimethylamino)-1-[4-(4-morpholinyl)phenyl]-1-butanone, 2-dimethylamino-2-(4-methyl-benzyl)-1-(4-morpholin-4-yl-phenyl)-butan-1-one, or any combination thereof.

In the above embodiments, in addition to the α-amino ketone, the photoinitiating system comprises a photosensitizer having absorption in the wavelength range of 340-420 nm, to achieve an effective initiation. As described above, the photosensitizer is capable of enhancing the response of the photoinitiator to a particular wavelength by extending the sensitivity of the photoinitiator to this wavelength. In the present disclosure, the α-amino ketone and the photosensitizer having absorption in the wavelength range of 340 to 420 nm together form a photoinitiator system. In case that a light emitting diode (LED) is used as a radiation source to perform radiation curing, the photosensitizer can absorb LED light radiation in the wavelength range of 340-420 nm and transfer energy to the α-amino ketone, thus to excite α-amino ketone to produce active species.

According to the present disclosure, the photosensitizer comprises thioxanthone or derivatives thereof, benzophenone derivatives, camphorquinone or derivatives thereof, or a combination thereof. In one embodiment of the present disclosure, the photosensitizer comprises thioxanthone or derivatives thereof that is capable of absorbing the radiation in the wavelength range from about 360 to about 420 nm, for example from about 365 to about 405 nm, in particular from about 380 to about 400 nm, preferably comprises a thioxanthone derivative, i.e., a substituted thioxanthone, optionally substituted by $C_{1-12}$ alkyl, $C_{1-12}$ alkoxy, halogen, carboxyl, ester group, amide group or the combination thereof. As an example of such thioxanthone derivative, isopropyl thioxanthone, 2-chlorothioxanthone, 2,4-diethylthioxanthone, 1-chloro-4-propoxythioxanthone, or any combination thereof can be used. Preferably, isopropyl thioxanthone (ITX) is used as the photosensitizer because ITX is relatively inexpensive.

In the embodiment in which the photoinitiating system comprises an α-amino ketone and a photosensitizer having an absorption in the wavelength range of 340-420 nm, the weight ratio of the photosensitizer to the α-amino ketone is preferably in the range of 1:1 to 1:10, more preferably in the range of 1:2 to 1:6, most preferably 1:3.

The inventors of the present disclosure have surprisingly found that, when the light emitting diode LED is used as a radiation source for radiation curing, a photoinitiating system in which an α-aminoketone is combined with a photosensitizer having an absorption in the wavelength range of 340-420 nm can achieve effective curing.

Figure 2:
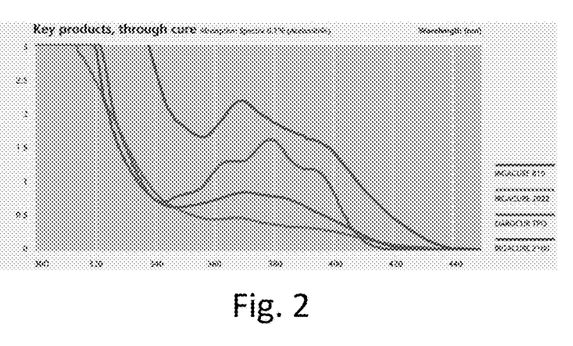
FIG. 2 schematically shows the absorption spectra of a phosphine oxide photoinitiators (0.1%, in acetonitrile).

In another embodiment of the present disclosure, the photoinitiating system comprises an acylphosphine oxide having a significant absorption under LED light irradiation in a wavelength range of 340-420 nm. As another typical cleavage type photoinitiator, the maximum absorption peak at which the acylphosphine oxide can effectively absorb the light emitted by the light emitting diode LED is in the range of 340-420 nm. FIG. 2 schematically shows the absorption spectra of IRGACURE 819 and DAROCUR TPO as typical acylphosphine oxide photoinitiators.

According to the present disclosure, the acylphosphine oxide comprises monoacylphosphine oxide, diacylphosphine oxide, or the combination thereof. The diacylphosphine oxide may be a compound of formula (I):

wherein each of $A^1$, $Ar^2$ and $Ar^3$ is independently selected from a substituted or unsubstituted C6-C18 aryl group or a C1-C6 alkyl group.

The structure of the monoacylphosphine oxide is similar to that of the diacylphosphine oxide, except that only one acyl group is directly linked to phosphorus. As an example, the monoacylphosphine oxide may be a compound of formula (II) (Lucirin TPO-L):

Acylphosphine oxides suitable for use in the present disclosure include, but are not limited to, 2,4,6-trimethylbenzoyl diphenylphosphine oxide (Lucirin TPO, commercially available from BASF), 2,4,6-trimethylbenzoyl phenyl ethoxy phosphine oxide (Lucirin TPO-L, commercially available from BASF), bis(2,4,6-trimethylbenzoyl)-phenylphosphine oxide (IRGACURE 819, commercially available from BASF) or any combination thereof.

At present, the most successful commercial acylphosphine oxide is IRGACURE 819, Lucirin TPO and Lucirin TPO-L, which are capable of absorbing UV light in the wavelength range of 385-410 nm. The inventors have found that although the photoinitiating system containing only acylphosphine oxide alone can cure the aqueous UV-LED curing system, the surface curing properties are somewhat inferior due to the sensitivity of the acylphosphine oxide radical to the oxygen inhibition. However, acylphosphine oxides can provide significantly improved surface curing by combining with thioxanthone derivatives.

Thus, in the case where the photoinitiating system comprises an acylphosphine oxide, the photoinitiating system preferably further comprises thioxanthone or derivative thereof, preferably thioxanthone derivative. According to the present disclosure, the thioxanthone derivative is a substituted thioxanthone, optionally substituted by $C_{1-12}$ alkyl, $C_{1-12}$ alkoxy, halogen, carboxyl, ester group, amide group or any combination thereof. As examples of the thioxanthone derivative, isopropyl thioxanthone, 2-chlorothioxanthone, 2,4-diethylthioxanthone, 1-chloro-4-propoxythioxanthone, or any combination thereof can be used. Preferably, isopropyl thioxanthone (ITX) is used because ITX is relatively inexpensive.

Dispersing Medium

According to the present disclosure, the photoinitiating composition comprises a water-miscible organic solvent as a dispersing medium. The photoinitiating composition formed by mixing a photoinitiating system suitable for LED light irradiation having a wavelength in the range of 340-420 nm with a dispersing medium can be directly used to formulate a UV-LED curable aqueous coating composition.

It is well known that UV-LED radiation sources have the advantage of low energy consumption, but they also inevitably produce lower radiation energy. Moreover, for the aqueous coating compositions cured by using radiation, particularly UV-LED, since the water in the system has a relatively low refractive index, it tends to require higher radiation energy and photoinitiator having superior properties when using radiation curing. So far, photoinitiators suitable for formulating UV-LED curable aqueous coating compositions are numbered only including IRGACURE 819DW from BASF.

However, the inventors of the present disclosure have surprisingly found that the photoinitiating composition formed by mixing a photoinitiating system suitable for LED light irradiation having a wavelength in the range of 340-420 nm and a water-miscible organic solvent as a dispersion medium can be directly used to formulate a UV-LED curable aqueous coating composition and provides good curing results. For example, the resulting coating has a good pendulum hardness. In addition, the thus prepared photoinitiating composition has good storage stability and can be used as a separate component, which greatly simplifies the preparation of an aqueous coating composition.

According to the present disclosure, the dispersion medium suitable for formulating the photoinitiating composition comprises an alcohol, an alcohol ether or a combination thereof.

As a suitable example of the dispersion medium, an alcohol ether may be used. Preferably, the alcohol ether is selected from the group consisting of ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol monobutyl ether, propylene glycol monomethyl ether, propylene glycol monobutyl ether, dipropylene glycol monomethyl ether, and any combination thereof, more preferably ethylene glycol monobutyl ether.

As a suitable example of the dispersion medium, an alcohol may be used. Preferably, the alcohol is selected from the group consisting of methanol, ethanol, isopropanol, tetrahydrofurfuryl alcohol, ethylene glycol, diethylene glycol, propylene glycol, dipropylene glycol, glycerol, and any combination thereof.

In a preferred embodiment of the present disclosure, an alcohol ether is used as the dispersion medium, and ethylene glycol monobutyl ether is preferably used as the dispersion medium.

According to the present disclosure, the weight ratio of the photoinitiator to the dispersion medium is in the range of 1:8 to 1:20, preferably in the range of 1:8 to 1:15, more preferably about 1:10.

According to the present disclosure, at least one component of the photoinitiating system is dissolved in the dispersion medium or dispersed in the dispersion medium, preferably dissolved in the dispersion medium.

UV-LED Curable Aqueous Coating Composition

In another aspect of the present disclosure, it provides an UV-LED curable aqueous coating composition comprising the photoinitiating composition according to the present disclosure, water, an aqueous latex containing ethylenically unsaturated functional group, and optionally additional additives.

The content of the photoinitiating composition of the present disclosure is in the range of 5 to 20 wt %, preferably in the range of 5 to 17 wt %, more preferably in the range of 5 to 15 wt %, relative to the total weight of the UV-LED curable aqueous coating composition.

As an aqueous latex containing ethylenically unsaturated functional group, a pure acrylic ester aqueous latex containing ethylenically unsaturated functional group, a silicone-modified acrylate aqueous latex containing ethylenically unsaturated functional group, a styrene-acrylic aqueous latex containing ethylenically unsaturated functional group, a polyurethane aqueous latex containing ethylenically unsaturated functional group, a vinyl acetate aqueous latex containing ethylenically unsaturated functional group, and combinations thereof, which is commonly used in the preparation of a coating composition, can be used. Aqueous latex containing ethylenically unsaturated functional group may be commercially available or may be synthetized. In one embodiment of the present invention, the aqueous latex containing ethylenically unsaturated functional group is a commercially available urethane acrylate aqueous latex such as the UCECOAT 7700 or UCECOAT 7891 commercially available from Allnex Company.

The content of the aqueous latex containing ethylenically unsaturated functional group is preferably in the range of 20 to 90 wt %, preferably in the range of 30 to 85 wt %, more preferably in the range of 50 to 85 wt %, even more preferably in the range of 60 to 85 wt %, based on the total weight of the UV-LED curable aqueous coating composition.

The UV-LED curable aqueous coating compositions of the present disclosure may also contain suitable amount of water to adjust the viscosity of the coating composition to suit a particular coating process. The water content relative to the total weight of the UV-LED curable aqueous coating composition may vary over a wide range. Preferably, the UV-LED curable aqueous coating composition of the present disclosure may comprise 5 to 20 wt %, preferably 5 to 17 wt %, more preferably 5 to 15 wt % of water.

The UV-LED curable aqueous coating compositions of the present disclosure may optionally contain additional additives that are commonly used in aqueous coating compositions which do not adversely affect the coating composition or the cured coating obtained therefrom. Suitable additives include, for example, the agents that can improve the processability or manufacturing properties of the composition, enhance the aesthetics of the composition, or improve the specific functional properties or properties of the coating composition or the cured composition obtained therefrom, such as adhesion to the substrate. Examples of such additives are for example carriers, emulsifiers, film forming auxiliaries, co-solvents, pigments, fillers, anti-migrating agents, antibacterial agents, chain extenders, lubricants, wetting agents, biocides, plasticizers, antifoaming agents, colorants, waxes, antioxidants, anticorrosive agents, flow control agents, thixotropic agents, dispersants, adhesion promoters, UV stabilizers, thickeners, defoamers, pH adjusters, or combination thereof. The content of each optional ingredient is sufficient to achieve its intended purpose, but preferably such content does not adversely affect the coating composition or the cured coating obtained therefrom. In the preferred embodiment of the present disclosure, suitable additional additives include thickeners, surfactants, defoamers, bactericides, fungicides, or any combination thereof.

The additional additive is present in an amount of about 0 to about 40% by weight, preferably about 0.1 to about 40% by weight, relative to the total weight of the UV-LED curable aqueous coating composition. In one embodiment of the present disclosure, the aqueous coating composition comprises 0.1 to about 20% by weight of the additional additive relative to the total weight of the aqueous coating composition. In particular, the amount of additional additive contained in the coating composition is from about 0.2% by weight, 0.3% by weight, about 0.4% by weight, about 0.6% by weight, about 0.7% by weight, about 0.8% by weight or about 0.9% by weight to about 9.0% by weight, about 7.0% by weight, about 6.0% by weight, about 5.0% by weight, about 4.0% by weight, about 2.0% by weight, or about 1.0% by weight, relative to the total weight of the coating composition.

In one embodiment of the present disclosure, the UV-LED curable aqueous coating composition comprises:
5 to 20 wt % of the photoinitiating composition;
5 to 20 wt % of water
20 to 90 wt % of the aqueous latex containing ethylenically unsaturated functional group;
0 to 40 wt % of additional additive,
relative to the total weight of the UV-LED curable aqueous coating composition.

In one embodiment, the UV-LED curable aqueous coating composition comprises a photoinitiating composition according to the present disclosure, water, a urethane acrylate aqueous latex, and a defoamer, a surfactant and a thickener as additional additives. As an example of the antifoaming agent, BYK 028 available from BYK Corporation may be used. As an example of the surfactant, BYK-346 available from BYK Corporation may be used. As an example of the thickener, ACRYSOL RMTM-2020E can be used. As an example of the urethane acrylate aqueous latex, UCECOAT 7700 or UCECOAT 7891 available from Allnex may be used.

The UV-LED curable aqueous coating composition according to the present disclosure is curable when irradiated with light emitted by a light emitting diode (LED), wherein the wavelength of the light is 340 nm to 420 nm, more preferably 380 nm to 410 nm.

In the present disclosure, the preparation of the UV-LED curable aqueous coating composition can be carried out by i) formulating the photoinitiating composition according to the present disclosure; and ii) mixing the photoinitiating composition of step i) with water, an aqueous latex containing ethylenically unsaturated functional group and optionally additional additives to formulate the UV-LED curable aqueous coating composition.

According to the present disclosure, the UV-LED curable aqueous coating composition can be applied by conventional coating methods known to those skilled in the art. The coating methods include dip coating, spin coating, spray coating, curtain coating, brush coating, roll coating, and other coating methods known in the art.

When the UV-LED curable aqueous coating composition according to the present disclosure is applied on the surface of a substrate to be coated and irradiated by the light from a light emitting diode (LED) having a wavelength of about 340 nm to 420 nm, more preferably 380 nm to 410 nm, the composition can undergo a photopolymerization so as to provide a cured coating on the surface of the substrate.

The UV-LED curable aqueous coating composition according to the present disclosure can provide good surface curing properties after curing. Compared with conventional aqueous one-component coating composition, aqueous two-component coating composition and solvent-based two-component coating composition, after curing, the UV-LED curable aqueous coating composition according to the present disclosure can result in a coating having comparable, even better surface hardness.

Thus, the present disclosure also provides an article comprising a substrate fully or partially coated with a UV-LED curable aqueous coating composition according to the present disclosure or a UV-LED curable aqueous composition obtainable by the process according to the present disclosure. One of ordinary skill in the art will select and determine the appropriate material as a substrate depending on the actual needs.

The substrate may be a non-heat-sensitive substrate, for example glass, ceramic, fiber cement board, or metal, for example aluminum, copper or steel, or may be a heat-sensitive substrate. In view of the fact that the UV-LED curable aqueous coating composition of the present disclosure can be cured with an LED radiation source having a low radiation energy, it is particularly suitable to provide a coating for a heat-sensitive substrate (preferably wood).

Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates.

Test Method:

Unless otherwise indicated, the following test methods are used in the following examples.

Pendulum Hardness

Pendulum hardness was used to measure the curing properties of the cured system, especially the surface curing properties. Pendulum hardness was measured according to GB/T 1730-2007.

Gloss Test

Cured coatings as described herein were tested for surface gloss according to ASTM D523 at a 60° angle using a Sheen gloss meter.

Pencil Hardness

This test was used to measure the hardness of the cured coating. Use ASTM D3363 to evaluate pencil hardness. The data were reported as pencil hardness for the last successful test before the rupture of the coating. Thus, for example, if the coating does not break when tested with a 2H pencil but is ruptured when tested with a 3H pencil, the coating is reported as a pencil hardness with 2H.

Adhesion

An adhesion test was performed to assess whether the coating was adhered to the coated substrate. The adhesion test was performed according to ASTM D 3359-Test Method B. Adhesion is usually classified as 0-5B, where 5B represents the optimal adhesion.

Solvent Resistance Test

Conduct a tolerance test of a solvent, such as methyl ethyl ketone or alcohol, to assess the "curing" or cross-linking of the coating. This test was carried out as described in ASTM D 5402 93. After a certain number (usually 50) of double-rubs (i.e., one back-and forth motion), the integrity of the coating was determined. Solvent resistance was usually divided into grades of 0-5, where 5=coating is complete without scratches (best), 4=almost no coating scratches, 3=clear that the coating is scratched, 2=the gloss of the coating disappears due to scratches, 0=the coating is peeled off to reach the substrate (worst).

Print Resistance

The print resistance was evaluated according to ASTM D2091-1996 (2003). At a temperature of 25° C. or 50° C., the coating was pressed out at a constant pressure, where the starting pressure was 0, increasing by 0.5 psi each time. The stamping state was maintained for 24 hours at a predetermined pressure. After 24 hours, it is determined whether indentation occurs under this pressure or not. The data was reported as the pressure for the last successful test before the indentation of the coating occurring.

Example

The present disclosure is more particularly described in the following examples that are intended as illustrations only, since numerous modifications and variations within the scope of the present disclosure will be apparent to those skilled in the art.

Unless otherwise noted, all parts, percentages, and ratios reported in the following examples are based on weight, and all reagents used in the examples are commercially available, and used directly as they were originally obtained.

Materials

All the materials used in the examples are listed in Table 1 below:

TABLE 1

Materials used and related information

| Component | Brief description |
|---|---|
| IRGACURE 369 | 2-benzyl-2-(dimethylamino)-1-[4-(4-morpholinyl)phenyl]-1-butanone, available from BASF |
| IRGACURE 907 | 2-methyl-1-(4-methylthiophenyl)-2-morpholinyl-1-propanone, available from BASF |
| IRGACURE 819 | bis(2,4,6-trimethylbenzoyl)phenylphosphine oxide, available from BASF |
| Lucirin TPO-L | 2,4,6-trimethylbenzoyl phenyl ethoxy phosphine oxide, available from BASF |
| Lucirin TPO | 2,4,6-trimethylbenzoyldiphenylphosphine oxide, available from BASF |

TABLE 1-continued

Materials used and related information

| Component | Brief description |
|---|---|
| ITX | 2-isopropyl thioxanthone, available from BASF |
| Butyl Cellosolve (BCS) | butyl cellosolve, i.e. ethylene glycol monobutyl ether, as a cosolvent |
| UCECOAT 7700 | waterborne polyurethane acrylate latex, available from Allnex |
| UCECOAT 7891 | waterborne polyurethane acrylate latex, available from Allnex |
| BYK028 | defoamer, available from BYK, Germany |
| BYK346 | surfactant, available from BYK, Germany |
| BYK306 | leveling agent, available from BYK, Germany |
| BYK141 | defoamer, available from BYK, Germany |
| ACRYSOL RM ™-2020E | thickener, available from DOW |
| ROSHIELE ™ 3311 | waterborne acrylic latex, available from DOW |
| DPM | dipropylene glycol methyl ether, as a cosolvent, available from DOW |
| DPnB | dipropylene glycol n-butyl ether, used as a cosolvent, available from DOW |
| BayhydurXP2655 | curing agent, available from Bayer |
| AC2598 | waterborne hydroxyl acrylic resin, available from ALBERDINGK BOLEY GmbH |
| PMA | propylene glycol methyl ether acetate, available from BASF |
| MIBK | methyl isobutyl ketone, available from BASF |
| BAC | butyl acetate, available from BASF |
| POLURGREEN ES.M | toluene diisocyanate available from SAPIC, Italy |

Preparation of Photoinitiating Composition

The photoinitiating composition was formulated by using the ingredients shown in Table 2 below. The detailed steps were as follows: a certain amount of each component was weighed at room temperature, and the photoinitiating system was dissolved or dispersed in ethylene glycol monobutyl ether under stirring to obtain a corresponding photoinitiating composition.

TABLE 2

| No. | Ingredient | Sample 1/ weight part | Sample 2/ weight part | Sample 3/ weight part | Sample 4/ weight part | Sample 5/ weight part |
|---|---|---|---|---|---|---|
| 1 | IRGACURE 819 | 0.42 | | 0.42 | | 0.42 |
| 2 | IRGACURE 369 | | 0.84 | | | |
| 3 | IRGACURE 907 | | | | 0.84 | |
| 4 | Lucirin TPO-L | 0.42 | | | | |
| 5 | Lucirin TPO | | | 0.42 | | 0.42 |
| 6 | ITX | 0.28 | 0.28 | 0.28 | 0.28 | |
| 7 | BCS | 11.2 | 11.2 | 11.2 | 11.2 | 11.2 |

Formulation of UV-LED Curable Aqueous Coating Composition

The UV-LED curable aqueous coating composition was formulated by using the ingredients as shown in Table 3 below. The photoinitiating compositions of Sample 1-5, water, defoamers, surfactants and thickers were added to the aqueous latex under agitation to form an aqueous coating composition.

The resulting aqueous coating composition was drawn down on a glass panel to form a coating having a thickness of 120 microns. Then, the thus formed coated panel was dried in air for 30 minutes, dried at 50° C. for 10 minutes, then cooled in air for 10 minutes, followed by LED-UV curing. The LED UV lamp was purchased from Shenzhen Renwei Photoelectric Co. Ltd., which emits light at a wavelength of 395 nm. When curing, the distance between the LED lamp and the sample was 2 cm and the curing time was 5 seconds.
The pendulum hardness of the cured coating was measured according to the method listed in Test method as described above, and the results were shown in Table 3.

TABLE 3

| Composition | Example 1 | Example 2 | Example 3 | Example 4 | Example 5 |
|---|---|---|---|---|---|
| Sample 1 | 12 wt % | | | | |
| Sample 2 | | 12 wt % | | | |
| Sample 3 | | | 12 wt % | | |
| Sample 4 | | | | 12 wt % | |
| Sample 5 | | | | | 12 wt % |
| water | 7 wt % | 7 wt % | 7 wt % | 7 wt % | 7 wt % |
| thickener | 0.3 wt % | 0.3 wt % | 0.3 wt % | 0.3 wt % | 0.3 wt % |
| defoamer | 0.5 wt % | 0.5 wt % | 0.5 wt % | 0.5 wt % | 0.5 wt % |
| surfactant | 0.2 wt % | 0.2 wt % | 0.2 wt % | 0.2 wt % | 0.2 wt % |
| UCECOAT 7700 | 80 wt % | 80 wt % | | | 80 wt % |
| UCECOAT 7891 | | | 80 wt % | 80 wt % | |
| Property | | | | | |
| Pencil hardness (before curing)/s | 30 | 29 | 4 | 5 | 30 |
| Pencil hardness (after curing)/s | 112 | 112 | 79 | 69 | 76 |

From the above results, it can be seen that the photoinitiating composition according to the present disclosure can be used directly for the preparation of a UV-LED curable aqueous coating composition and that the thus formulated aqueous coating composition can be well cured by UV, especially surface curing. Furthermore, the inventors have surprisingly found that Example 1, which also contains the thioxanthone derivative ITX, can provide a coating having significantly better surface curing property than that of the photoinitiating system of Example 5 in which the photoinitiator is composed only of phosphine oxide,
Properties of the Coating
Various coating compositions were prepared as shown in Table 4 below. In addition to the aqueous coating composition of the present disclosure, Table 4 further comprises a one-component aqueous coating composition WB 1K as Comparative Example A, a two-component aqueous coating composition WB 2K as Comparative Example B and a two-component solvent-based coating composition SB 2K as Comparative Example C, wherein component A of Comparative Example B was listed in Table 4 below, component B was Bayer 2655, and component A:component B:water (w/w)=100:20:10; component A of Comparative Example C was listed in Table 4 below, component B was POLUR-GREEN ES.M, and component A:component B:BAC (w/w) =100:50:25.

The coating formed from the UV-LED curable aqueous coating composition according to the present disclosure was compared with a coating formed from a one-component or two-component aqueous topcoat or solvent-based topcoat prepared from conventional resins. The aqueous coating composition of the present disclosure was subjected to LED-UV curing to form a coating. The LED UV lamp was purchased from Shenzhen Renwei Photoelectric Co., LTD., with an emission wavelength of 395 nm. When curing, the distance between the LED lamp and the sample was 2 cm and the curing time was 5 seconds. The paint prepared from Comparative Example A-C was drawn down on an aged PU board to form a 100 μm wet coating. The coated boards were dried in air for 30 minutes and dried in an oven at 50° C. for 2 h to form a coating.

The properties of the cured coatings were then determined according to the method listed in the Test method. The coatings was air dried for 7 days before the test and the results were shown in the following Table 5 and FIG. 3.

TABLE 4

| Example According to the present invention | wt % | Comparative Example A | wt % | Comparative Example B | wt % | Comparative Example C | wt % |
|---|---|---|---|---|---|---|---|
| UCECOAT 7700 | 80 | ROSHIELE ™ 3311 | 80 | AC2598 | 80 | AP572 | 80 |
| water | 12 | water | 12 | water | 12 | PMA | 10 |
| BCS | 5.0 | DPM | 3.5 | DPM | 3.5 | MIBK | 5 |
| | | DPnB | 3.5 | DPnB | 3.5 | BAC | 3 |
| IRGACURE 819 | 0.2~1.0 | — | | — | | — | |
| Lucirin TPO | 0.2~1.0 | | | | | | |
| ITX | 0.05~0.5 | | | | | | |
| BYK028 | 0.5 | BYK028 | 0.5 | BYK028 | 0.5 | BYK306 | 1 |
| BYK346 | 0.2 | BYK346 | 0.2 | BYK346 | 0.2 | BYK141 | 1 |
| ACRYSOL RM ™ -2020E | 0.3 | ACRYSOL RM ™ -2020E | 0.3 | ACRYSOL RM ™ -2020E | 0.3 | — | — |
| Total | 100 | Total | 100 | Total | 100 | Total | 100 |

TABLE 5

| Item | Gloss (sheen) | Pencil hardness | Adhesion | MEK rub (50times) | Alcohol rub (50times) | Print resistance 25° C. (pass) | 25° C. (pass) |
| --- | --- | --- | --- | --- | --- | --- | --- |
| Coating of the present disclosure | 80 | H | 5B | 4 | 4 | 2 psi | 1 psi |
| Comparative Example A | 81 | B | 4B | 0 | 2 | 0.5 psi | <0.5 psi |
| Comparative Example B | 30 | H | 4B | 4 | 4 | 2 psi | 1 psi |
| Comparative Example C | 29 | H | 5B | 3 | 4 | 2 psi | 1 psi |

Figure 3:
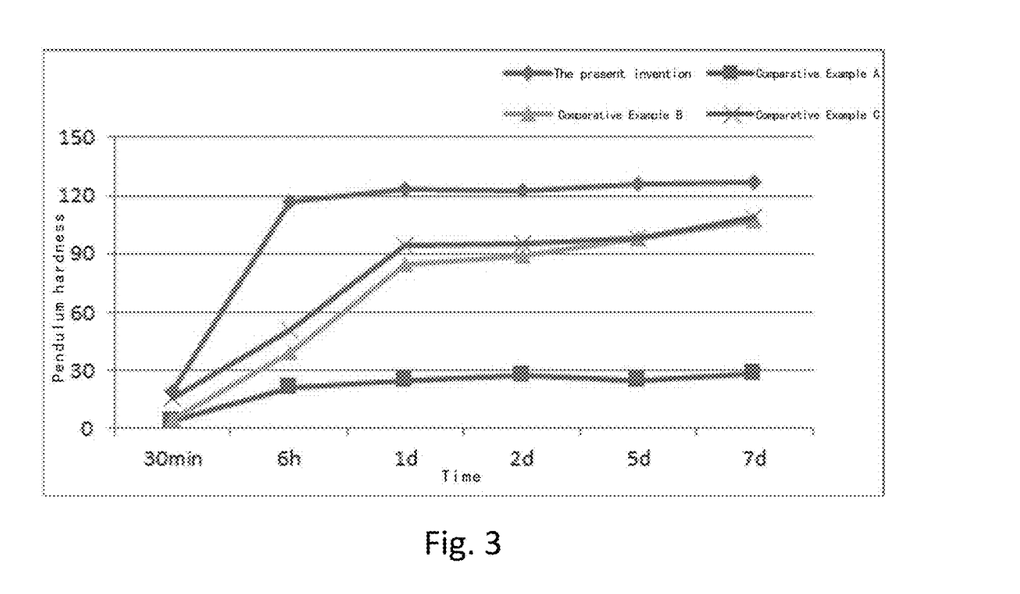
FIG. 3 schematically shows the changes of the pendulum hardness of the coating formed from a UV-LED curable aqueous coating composition according to the present disclosure and that of the coating formed from a one-component or two-component aqueous topcoat or solvent-based topcoat made from conventional resin with the curing time.

As can be seen from the results in Table 5, compared to conventional aqueous one-component coating composition, aqueous two-component coating composition or solvent-based two-component coating composition, the aqueous coating composition the UV-LED curable aqueous coating composition according to the present disclosure after curing, can achieve a coating having comparable, even better performance. In addition, as shown in FIG. 3 that the UV-LED curable aqueous coating composition according to the present disclosure can obtain a coating having excellent surface hardness during a short curing time.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

While the present invention has been described with reference to a number of embodiments and examples, those skilled in the art will recognize that other embodiments may be devised in accordance with the teachings of the present invention without departing from the scope and spirit of the invention.

The invention claimed is:

1. A photoinitiating composition, comprising
a) a photoinitiating system suitable for LED light irradiation having a wavelength in the range of 340-420 nm;
b) a dispersing medium;
wherein the photoinitiating system comprises a photoinitiator and a photosensitizer;
wherein the photoinitiator is an acylphosphine oxide or an α-aminoketone, and the photosensitizer is thioxanthone or derivatives thereof;
wherein the dispersing medium comprises an organic solvent which is miscible with water; and
wherein the dispersing medium comprises a glycol ether selected from the group consisting of ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, propylene glycol monomethyl ether, propylene glycol mono-butyl ether, dipropylene glycol monomethyl ether, and any combination thereof.

2. The photoinitiating composition according to claim 1, wherein the photoinitiating system comprises α-aminoketone and photosensitizer having absorption in the wavelength range of 340-420 nm.

3. The photoinitiating composition according to claim 1, wherein the photoinitiating system comprises an acylphosphine oxide.

4. The photoinitiating composition according to claim 1, wherein the dispersing medium comprises an alcohol, glycol ether or a combination thereof.

5. The photoinitiating composition according to claim 2, wherein the photosensitizer comprises a substituted thioxanthone having an alkyl, alkoxy, halogen, carboxyl, ester or amide group or any combination thereof.

6. The photoinitiating composition according to claim 5, wherein the substituted thioxanthone comprises isopropyl thioxanthone, 2-chlorothioxanthone, 2,4-diethylthioxanthone, 1-chloro-4-propoxythioxanthone, or any combination thereof.

7. The photoinitiating composition according to claim 2, wherein the α-aminoketone comprises an α-aminoalkyl phenone.

8. The photoinitiating composition according to claim 7, wherein the α-aminoalkyl phenone comprises 2-methyl-1-[4-(methylthio)phenyl]-2-morpholinopropanone-1, 2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, or any combination thereof.

9. The photoinitiating composition according to claim 3, wherein the acylphosphine oxide comprises a monoacylphosphine oxide, a diacylphosphine oxide or combination thereof.

10. The photoinitiating composition according to claim 9, wherein the acylphosphine oxide comprises 2,4,6-trimethylbenzoyl diphenylphosphine oxide, 2,4,6-trimethylbenzoyl phenyl ethoxy phosphine oxide, bis(2,4,6-trimethylbenzoyl)-phenylphosphineoxide, or any combination thereof.

11. The photoinitiating composition according to claim 2, wherein the weight ratio of the photosensitizer to the α-aminoketone is in the range from 1:1 to 1:10.

12. The photoinitiating composition according to claim 1, wherein at least one component of the photoinitiating system is dissolved in the dispersing medium.

13. A UV-LED curable aqueous coating composition comprising the photoinitiating composition according to claim 1, water, an aqueous latex containing an ethylenically unsaturated functional group, and optionally additional additives.

14. The UV-LED curable aqueous coating composition according to claim 13, wherein the aqueous coating composition comprises:
5-20 wt % of the photoinitiating composition,
5-20 wt % of water, 20-90 wt % of the aqueous latex containing an ethylenically unsaturated functional group, and 0-40 wt % of additional additives, relative to the total weight of the UV-LED curable aqueous coating composition.

15. The UV-LED curable aqueous coating composition according to claim 13, wherein the composition is curable upon irradiation with light emitted from a light emitting diode (LED in the wavelength range of 340-420 nm.

16. A process for formulating a UV-LED curable aqueous coating composition, comprising:
   i) formulating the photoinitiating composition according to claim 1; and
   ii) mixing the photoinitiating composition of step i) with water, an aqueous latex containing an ethylenically unsaturated functional group and optionally additional additives to formulate the UV-LED curable aqueous coating composition.

17. An article, comprising a substrate that is fully or partially coated with the UV-LED curable aqueous coating composition according to claim 1 thereon.

18. The article according to claim 17, wherein the substrate is a heat-sensitive substrate.

19. The article according to claim 17, wherein the substrate is wood.

20. The article according to claim 19, wherein the substrate comprises plywood, veneer, particle board, low density fibre board, medium density fibreboard, high density fibreboard, Oriented Strand Board wood laminate, chipboard, foil covered wooden substrate, engineered wood, plastic modified wood, wood plastic compound (WPC) or a substrate with cellulosic fibres.

* * * * *